United States Patent [19]

Hirai

[11] Patent Number: 5,287,383
[45] Date of Patent: Feb. 15, 1994

[54] METHOD AND APPARATUS FOR PRODUCING ACTIVE CARBON USING CARBON-CONTAINING MATERIAL

[75] Inventor: Yoji Hirai, Omiya, Japan

[73] Assignee: Heiyo Shoji Kabushiki Kaisha, Omiya, Japan

[21] Appl. No.: 957,227

[22] Filed: Oct. 6, 1992

Related U.S. Application Data

[62] Division of Ser. No. 746,114, Aug. 15, 1991, Pat. No. 5,190,901.

[51] Int. Cl.$^5$ .......................... H05B 3/00; F27D 3/00
[52] U.S. Cl. .................................. 373/112; 373/109; 373/111; 373/115; 502/5; 502/416; 502/432
[58] Field of Search .................... 373/109, 110–113, 373/115, 118–120, 145; 502/5, 55, 418, 420, 432, 437; 201/19; 252/421, 422

[56] References Cited

U.S. PATENT DOCUMENTS

| | | | |
|---|---|---|---|
| 1,541,099 | 6/1925 | Barnebey et al. | 502/432 |
| 2,270,245 | 1/1942 | Barker | 373/113 |
| 3,676,365 | 7/1972 | Shirai et al. | 252/422 |
| 3,870,652 | 3/1975 | Whitten et al. | 252/421 |
| 3,994,829 | 11/1976 | Alford | 252/421 |
| 4,127,737 | 11/1978 | Hirakawa | 252/411 R |
| 4,192,962 | 3/1980 | Nakao et al. | 373/115 |
| 4,230,602 | 10/1980 | Bowen et al. | 252/421 |
| 4,268,417 | 5/1981 | Messer | 252/421 |
| 5,089,457 | 2/1992 | Gaylard et al. | 502/5 |
| 5,173,921 | 12/1992 | Gaylord et al. | 373/115 |
| 5,190,901 | 3/1993 | Hirai | 502/5 |

FOREIGN PATENT DOCUMENTS 56-21722 5/1981 Japan.

Primary Examiner—Bruce A. Reynolds
Assistant Examiner—Tu Hoang
Attorney, Agent, or Firm—Oldham, Oldham & Wilson Co.

[57] ABSTRACT

An apparatus for producing an active carbon using a carbon-containing material inclusive of an used active carbon as a raw material wherein the carbon-containing raw material is carbonized in a carbonizing unit to produce a carbonized material having electric conductivity and the carbonized material is then activated in an activating treatment unit installed downstream of the carbonizing unit in an atmosphere of steam with a power of electricity induced by electric discharge as well as a function of self-heating of the carbonized material with its own electric resistance are disclosed. The carbonizing unit is constructed in the form of a thermal radiation type batch furnace including an outer wall and a vessel mounted on a firing lattice in the outer wall while a heating chamber is formed therebetween. The activating treatment unit includes a screw conveyor, discharge electrodes arranged in the spaced relationship for inducing electric discharge between adjacent discharge electrodes and a rotary steam pipe having steam spray nozzles attached thereto. Alternatively, the activating treatment unit is constructed in a tunnel furnace including a chain conveyor for conveying the carbonized material, activating chambers, electrode plates on the opposite sides of the chain conveyor, steam spray nozzles, cooling chambers and water spray nozzles.

4 Claims, 4 Drawing Sheets

METHOD AND APPARATUS FOR PRODUCING ACTIVE CARBON USING CARBON-CONTAINING MATERIAL

This is a divisional of copending application Ser. No. 07/746,114 filed on Aug. 15, 1991 now U.S. Pat. No. 5,190,901.

BACKGROUND OF THE INVENTION

FIELD OF THE INVENTION

The present invention relates generally to a method and an apparatus for producing an active carbon using a carbon-containing material inclusive of an used active carbon. More particularly, the present invention relates to a method and an apparatus for producing an active carbon using a carbon-containing material inclusive of an used active carbon wherein the active carbon is produced by utilizing the power of electricity induced by electric discharge as well as a function of self-heating derived from electric resistance of an intermediate product of carbonized material with its own electric resistance.

DESCRIPTION OF THE RELATED ART

To produce an active carbon on the industrial basis, a plant based raw material such as wood chip, pulverized wood waste derived from sawing operations, liquid pulp waste, palm nut shells or the like and a mineral based raw material such as coal, petroleum coke, petroleum pitch or the like have been hitherto used. In addition, a waste material such as polyvinyl chloride resin and used tire can be used as a raw material for producing an active carbon after it is treated by employing a suitable method of allowing it to have electric conductivity. In practice, palm nut shells have been used as a most preferably employable raw material.

A so-called gas activating method has been hitherto known as one of methods each of treating palm nut shells to produce an active carbon. This method is practiced such that palm nut shells are indirectly heated up to an elevated temperature of 850° C. to 1000° C. in an airless state by using a combustion gas generated by an oil burner and the surface of the heated palm nut shells is then eroded by reaction of the palm nut shells with steam thereby to form a porous structure having a number of fine pores.

In addition, a method of producing an active carbon using an used active carbon as a raw material by inducing arc discharge through a layer of used active carbon so as to regenerate the same to resume its original active state has been disclosed in an official gazette of Japanese Publication Pat. No. 21722/1981.

With respect to the former prior method, since the reaction for activating the heated palm nut shells is composed of an endothermic reaction derived from a reaction of steam with carbon dioxide and carbon and an exothermic reaction derived from a reaction of oxygen with carbon, it is difficult to properly control a reaction temperature during each of the foregoing reactions. Additionally, since the palm nut shells are indirectly heated by using combustion gas generated by the oil burner, it is very difficult to properly control the reaction temperature, resulting in a quality of the resultant product of active carbon fluctuating. Consequently, an active carbon having a high quality can not be produced at a high yielding rate with this method. Another problem is that a long period of activating time, i.e., 6 to 20 hours is required at a working temperature of 850° C., and therefore, an active carbon can not be produced not only at high efficiency but also at a low cost.

With respect to the latter prior invention, it is easy to properly control a step of activating compared with the former prior invention. As mentioned above, palm nut shells most preferably employable as a raw material have been hitherto carbonized within the range of 700° C. to 1000° C. However, with the latter prior invention, there appears a problem that each carbonized palm nut shell has a part having electric conductivity and another part having no electric conductivity. In some case, the whole carbonized palm nut shell does not exhibit electric conductivity. In this case, carbonized palm nut shells can not be activated with the power of electricity induced by electric discharge. Therefore, the latter prior method has been practically employed exclusively as a method of regenerating an used active carbon for the purpose of reusing the same.

SUMMARY OF THE INVENTION

The present invention has been made in consideration of the aforementioned problems.

An object of the present invention is to provide a method and an apparatus for producing an active carbon using a carbon-containing material as a raw material wherein a product of active carbon having a high quality can be obtained not only at a high operational efficiency but also at a high yielding rate.

Another object of the present invention is to provide a method and an apparatus for producing an active carbon using an used active carbon as a raw material wherein a product of active carbon having a high quality can be obtained not only at a high operational efficiency but also at a high yielding rate.

According to one aspect of the present invention, there are provided a method and an apparatus for producing an active carbon using a carbon-containing material as a raw material, wherein the carbon-containing material is carbonized in a carbonizing unit to produce a carbonized material having electric conductivity and the carbonized material is then activated in an activating unit installed downstream of the carbonizing unit in an atmosphere composed of steam with the power of electricity induced by electric discharge as well as a function of self-heating of the carbonized material with its own electric resistance.

Further, according to another aspect of the present invention, there are provided a method and an apparatus for producing an active carbon using an used active carbon as a raw material, wherein the used active carbon is airtightly heated in a carbonizing unit so as to allow the used active carbon to resume its original operative state while exhibiting electric conductivity and the heated used active carbon is then activated in an activating unit installed downstream of the carbonizing unit in an atmosphere composed of steam with a power of electricity induced by electric discharge as well as a function of self-heating of the carbonized material with its own electric resistance.

The carbonizing unit is constructed in the form of a thermal radiation type batch furnace including an outer wall molded of a refractory material and a vessel mounting on a firing lattice in the outer wall with a heating chamber formed between the outer wall and the vessel while the raw material is airtightly received in the vessel.

The activating unit installed downstream of the carbonizing unit includes a spirally extending screw conveyor, a plurality of discharge electrodes arranged around the screw conveyor in the substantially equally spaced relationship for inducing electric discharge between adjacent discharge electrodes, and a rotary steam supply pipe having a plurality of steam supply nozzles attached thereto so as to allow steam to be sprayed therethrough toward the carbonized material to generate an atmosphere of steam.

Alternatively, the activating unit is constructed in the form of a tunnel furnace including a chain conveyor for conveying the carbonized material through the tunnel furnace, a plurality of activating chambers arranged in the upstream region of the tunnel furnace in the substantially equally spaced relationship on the chain conveyor, electrode plates arranged on the opposite sides of the chain conveyor for inducing electric discharge therebetween, a plurality of steam spray nozzles for spraying steam toward the carbonized material for generating an atmosphere of steam, a plurality of cooling chambers arranged in the downstream region of the tunnel furnace in the substantially equally spaced relationship on the tunnel furnace, and a plurality of water spray nozzles for spraying water toward the activated material to gradually cool the resultant product of active carbon.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments of the present invention.

Figure 1:
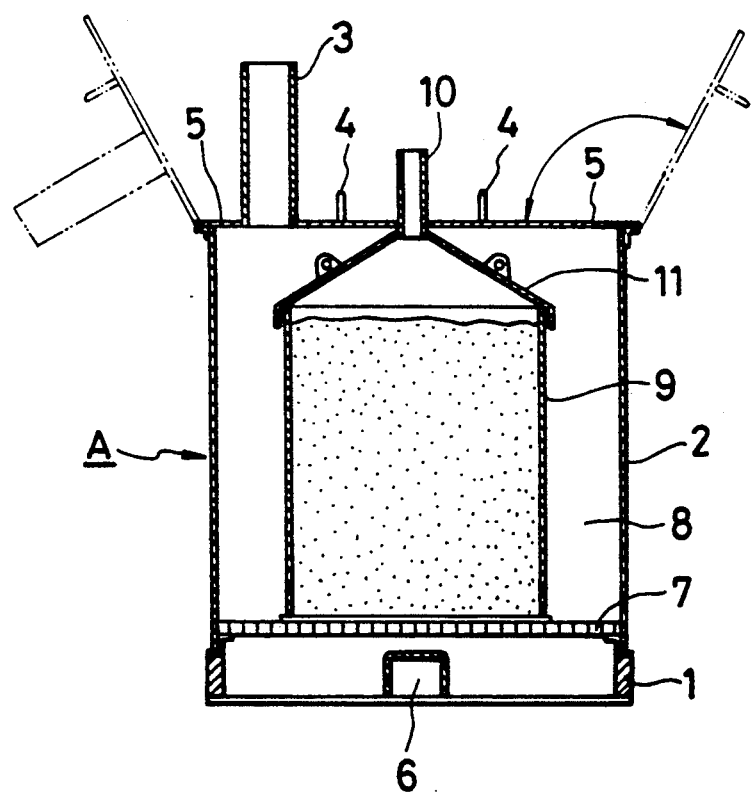
FIG. 1 is a vertical sectional front view of a thermal radiation type carbonizing unit in accordance with an embodiment of the present invention.
Figure 2:
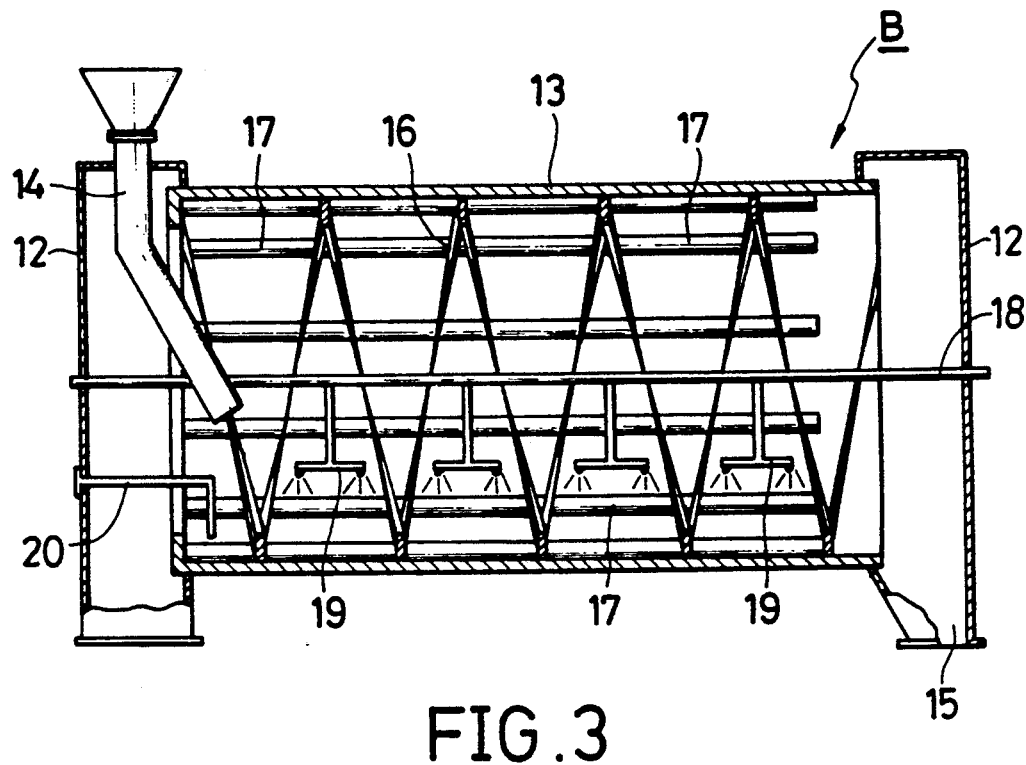
FIG. 2 is a vertical sectional side view of an activating treatment unit in accordance with the embodiment of the invention.
Figure 3:
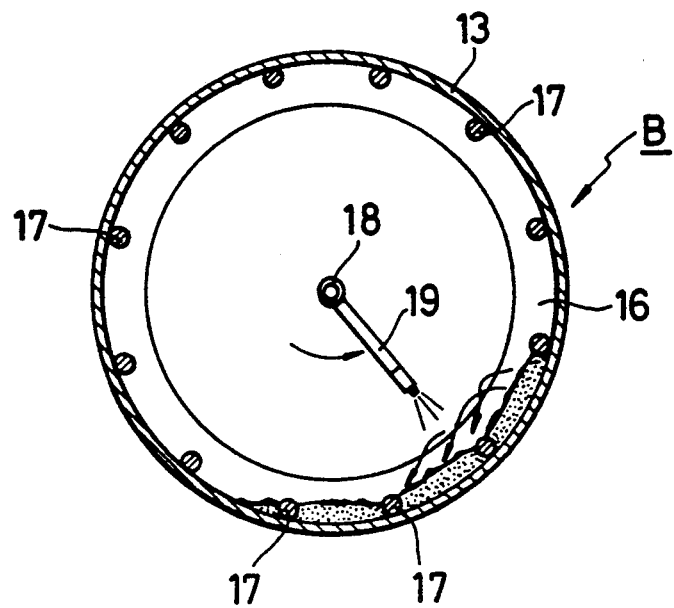
FIG. 3 is a vertical sectional front view of the activating treatment unit in FIG. 2.

FIG. 1 is a sectional front view of a thermal radiation type carbonizing unit A to which the present invention is applied, and FIG. 2 and FIG. 3 illustrate an activating treatment unit B to which the present invention is likewise applied, respectively.

The carbonizing unit A is constructed such that a cylindrical outer wall 2 molded of a refractory material is installed on a platform 1 and a chimney 3 made of a stainless steel and two cover halves 5 each made of a stainless steel and having a handle 4 secured thereto are removably mounted on the upper end of the outer wall 2. In addition, a flame inlet port 6 through which a firing flame generated by a burner is introduced into the interior of the carbonizing unit A is formed at the lower part of the platform 1, and a firing lattice 7 composed of a plurality of stainless steel pipes arranged in parallel with each other in the narrowly spaced relationship is arranged above the flame inlet port 6 so as to allow the firing flame to pass therethrough. A vessel 9 spaced away from the outer wall 2 is installed on the firing lattice 7 in the concentric relationship so that a heating chamber 8 is formed between the outer wall 2 and the vessel 9. A cover 11 having a chimney 10 secured thereto for the purpose of charging and discharging a raw material is removably placed on the vessel 9.

Next, the activating treatment unit B is constructed such that a rotary drum 13 is rotatably mounted between opposite support members 12 and one of the support members 12, i.e., the left-hand support member 12 includes a supply port 14 through which a carbonized material such as carbonized palm nut shells or the like is introduced into the interior of the activating treatment unit B, while other one of the support members 12, i.e., the right-hand support member 12 includes a discharge port 15 through which a resultant product of active carbon is discharged from the drum 13. In addition, a spirally extending screw conveyor 16 is mounted along the inner wall surface of the drum 13 for conveying the carbonized material in the stirred state. The screw conveyor 16 is provided with a plurality of discharge electrodes 17 arranged in the equally spaced relationship in the circumferential direction. A rotary steam supply pipe 18 is rotatably bridged between the both support members 12 along a central axis of the drum 13, and a plurality of radially extending T-shaped spray nozzles 19 are arranged in the equally spaced relationship in the axial direction of the steam supply pipe 18 for spraying steam toward the carbonized material on the inner wall surface of the drum 13. Additionally, a temperature sensor 20 is disposed in the drum 13 for monitoring the present temperature of the carbonized material.

In operation, first, a raw material, i.e., raw palm nut shells is filled in the vessel 9 of the carbonizing unit A and the cover 11 is airtightly placed on the vessel 9. Thereafter, the raw material is heated with the aid of a burner by introducing a firing flame into the carbonizing unit A through the flame inlet port 6 and then the firing flame flows in the heating chamber 8 through the gaps between adjacent pipes of the firing lattice 7 so as to maintain the heating chamber 8 at an elevated temperature higher than 600° C. When the vessel 9 is heated for two hours while the foregoing operative state is maintained, the raw palm nut shells filled in the vessel 9 is sufficiently carbonized without any intake of an environmental air under the influence of radiant heat from the outer wall 2 and combustion gas generated by the burner. Consequently, the palm nut shells are uniformly carbonized and the resultant product of carbonized material containing a very small amount of ash exhibits uniform electrical conductivity.

A few examples of production of carbonized palm nut shells will be described below with reference to Table 1.

EXAMPLE 1

Raw palm nut shells (A) of 14.5 kg shown in the table was charged in the vessel 9 and they were then heated at a temperature of 600° C. for about two hours. As a result, carbonized palm nut shells of 3.2 Kg having an electric resistance value of 1.5 ohms or less were obtained at a yielding rate of 22%.

EXAMPLE 2

Partially carbonized palm nut shells (B) each having electric conductivity but exhibiting a high ohm value shown in the table were heated for one hour in the same manner as the preceding example. The resultant product of carbonized palm nut shells each having an electric resistance value of 1.5 ohms or less were obtained at a yielding rate of 75%.

EXAMPLE 3

Uncarbonized palm nut shells (C) each having no electric conductivity were heated for 1.5 hours. As a result, carbonized palm nut shells each having a electric resistance value of 1.5 ohms were obtained at a yielding rate of 60%.

Results derived from the above-described examples are shown in Table 1.

TABLE 1

| material | carbonizing time | yielding rate | electric resistance value |
|---|---|---|---|
| A | two hours or shorter | 22% | 1.5 ohms or less |
| B | one hour or shorter | 75% | 1.5 ohms or less |
| C | 1.5 hours or shorter | 60% | 1.5 ohms or less |

As is apparent from the table, each of the raw palm nut shells (A), the partially carbonized palm shells (B) and the uncarbonized palm nut shells (C) can be carbonized to produce completely carbonized palm nut shells each having a electric resistance value of 1.5 ohms or less.

Subsequently, the carbonized palm nut shells are treated in the activating treatment unit B. First, carbonized palm nut shells are introduced into the interior of the activating treatment unit B as a raw material through a supply port 14. The carbonized palm nut shells are then conveyed while they are raised up as the screw conveyor 16 is rotated. At the same time, electric discharge is induced between adjacent electric discharge electrodes 17 in the drum 13 to heat the carbonized palm nut shells interposed therebetween by self-heating of them with their own electric resistance. Electricity consumed at this time remains within the range of 70 to 100 V and 40 A, and the temperature is elevated to 850° C. within a period of 20 seconds. Then, while the foregoing self-heating state is maintained, steam is sprayed through a plurality of nozzles 19 so as to allow the interior of the drum 13 to be filled with steam to form a steam atmosphere. Then, a controller (not shown) performs a controlling operation such that the carbonized palm nut shells are heated for about one hour while the temperature in the drum 13 maintains within the range of 850° C. ± 5° C. in an atmosphere composed of a mixture gas comprising combustion gas and steam. Consequently, the resultant product of completely activated palm nut shells is discharged through the discharge port 15.

Results derived from the method of the present invention are shown in Table 2 in comparison with those derived from the conventional method.

TABLE 2

| items of comparison | | Example 1 of conventional product | Example 2 of conventional product | product of present invention |
|---|---|---|---|---|
| yielding rate of product | relative to raw material during steps of drying/granulating | 54% | 50% | 95% |
| | relative to granulated raw material during step granulating | 42% | 65% | 90% |
| | activated raw material (product) during steps of refining/packing | 92% | 95% | 95% |
| | total yielding rate of product relative to raw material | 21% | 30.5% | 81.2% |
| quantity of consumption | kerosene | 1500 l | 2500 l | 300 l |
| | electricity | 800 KVA | 600 KVA | 450 KVA |
| | steam | 1400 kg | 1700 kg | 300 kg |
| staying time during production of active carbon | | 6 hours | 20 hours | 1 hour |

As described above, with the method of the present invention, active carbon having uniform properties can be produced under operative conditions that a quantity of fuel consumption is reduced by 5 to 8 times, an activating time is shortened to a level of 1/6 to 1/20 and a yielding rate is increased 2.7 to 3.8 times compared with those of the conventional method.

Figure 4:
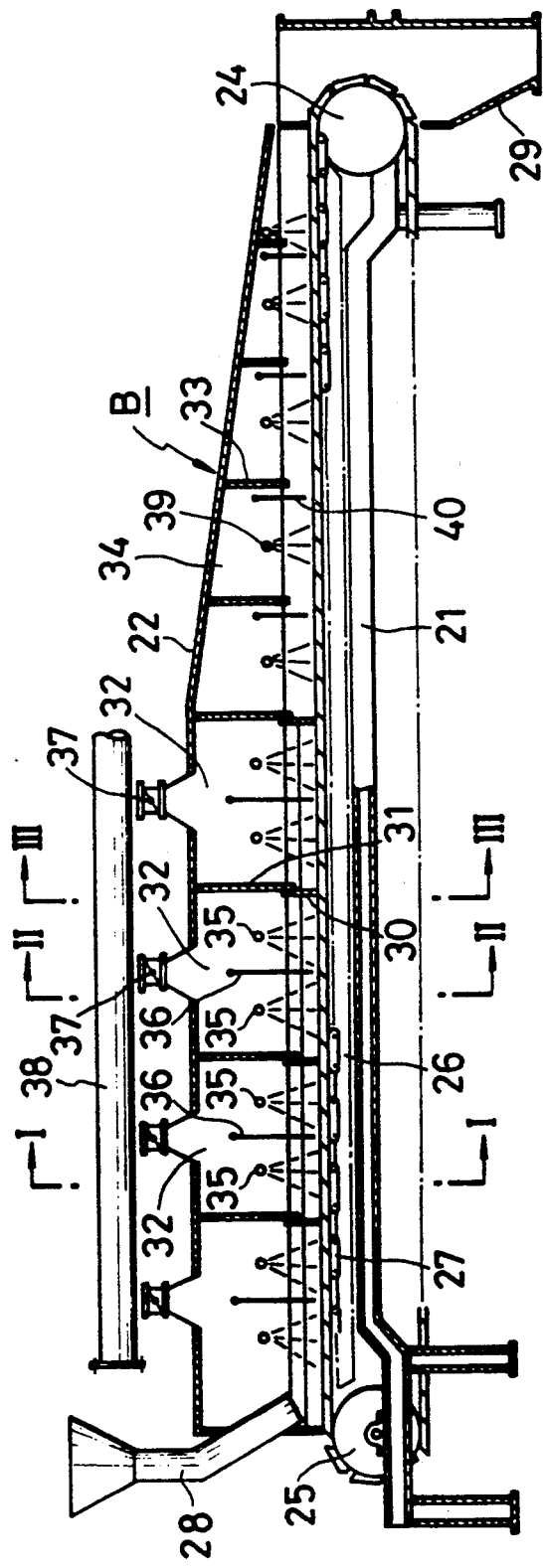
FIG. 4 is a vertical sectional side view of an activating treatment unit in accordance with another embodiment of the present invention.
Figure 5:
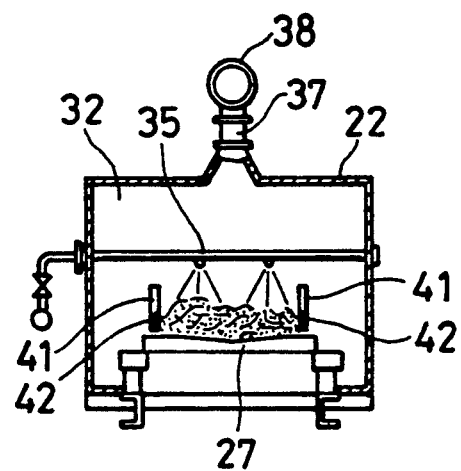
FIG. 5 a vertical sectional front view of the activating treatment unit taken along line I—I in FIG. 4.
Figure 6:
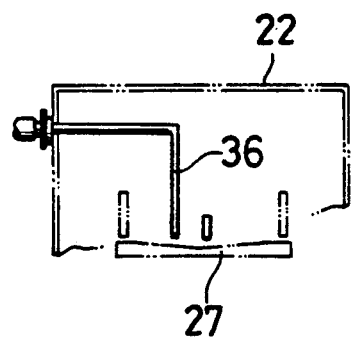
FIG. 6 is a vertical sectional front view of the activating treatment unit taken along line II—II in FIG. 4.
Figure 7:
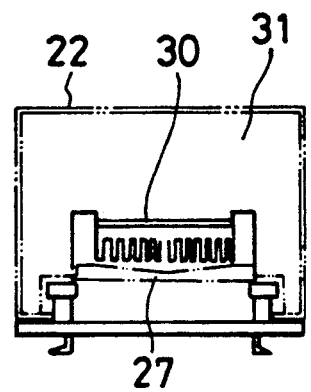
FIG. 7 is a vertical sectional front view of the activating treatment unit taken along line III—III in FIG. 4.

FIG. 4 to FIG. 7 illustrate an activating treatment unit B in accordance with another embodiment of the present invention, respectively. A characterizing feature of this embodiment consists in that a raw material is conveyed in the activating treatment unit B with the aid of a chain conveyor. Specifically, the activating treatment unit B is constructed in the form of a tunnel furnace including a frame 21 covered with a hood 22. A driving head pulley 24 is arranged at the right-hand end of the tunnel furnace, while a tail roller 25 is arranged at the left-hand end of the same as seen in FIG. 4. A chain rail 26 extends between the driving head pulley 24 and the tail roller 25 so that a chain conveyor 27 is bridged therebetween. A raw material supply chute 28 is arranged at the left-hand end of the chain conveyor 27 and a product discharge chute 29 is arranged at the right-hand end of the same. A plurality of partitions 31 each having a scraper 30 attached thereto at the lower end thereof are arranged in the suspended state in the upstream region of the tunnel furnace in the equally spaced relationship to form an activating chamber 32 between adjacent partitions 31, and a plurality of buckle plates 33 are arranged in the suspended state in the downstream region of the tunnel furnace in the equally spaced relationship to form a cooling chamber 34 between adjacent buckle plates 33. Each activating chamber 32 is equipped with a steam spray nozzle 35 and a thermometer 36 for monitoring the present temperature of the activating chamber 32. In addition, a dust collecting pipe 38 including dust collecting dampers 37 is mounted on the upper surface of the hood 22. On the other hand, each cooling chamber 34 is equipped with a water spray nozzle 39 and a thermometer 40 for monitoring the present temperature of the cooling chamber 34. Skirts 41 stand upright on the opposite sides of the chain conveyor 27 and electrode plates 42 are arranged on the skirts 41 in the opposing relationship.

In operation, first, a raw material of palm nut shells carbonized in the carbonizing unit A is introduced into the interior of the activating treatment unit B so that the carbonized palm nut shells are placed on the chain conveyor 27. As the conveyor 27 is recirculatively driven, the carbonized palm nut shells on the chain conveyor 27 successively move through the respective activating chambers 32. A certain magnitude of voltage is applied to the electrode plates 42 on the opposite sides of the chain conveyor 27 so that arc discharge is induced therebetween during movement of the carbonized palm nut shells to heat them as a function of self-heating of them with their own electric resistance. When the thermometer 36 detects that the present temperature exceeds 850° C., steam is sprayed toward the carbonized palm nut shells through the spray nozzles 35 which are operatively associated with the thermometer 36. A controller (not shown) performs a controlling operation such that the carbonized palm nut shells move across the respective activating chambers 32 within a period of 30 minutes to one hour while the temperature in each activating chamber 32 is properly controlled. On completion of the movement across all the activating chambers 32, the carbonized palm nut shells are completely activated. Subsequently, the activated palm nut shells are conveyed further toward the cooling chambers 34 at which cooling water is sprayed toward the activated palm nut shells through the spray nozzles 39 to gradually cool them while their temperature is properly controlled by the controller via the thermometer 40. Finally, the resultant product of activated palm nut shells, i.e., an active carbon is discharged through discharge chute 29.

It should be noted that the present invention should not be limited only to palm nut shells but other carbon-containing material may be employed as a raw material for carrying out the present invention. For example, an used active carbon may be substituted for the palm nut shells as a raw material.

As is apparent from the above description, the method of the present invention is practiced by combination of a step of carbonizing with a step of activating. Specifically, electric conductivity is given to the whole carbon-containing raw material during the step of carbonizing. Especially, electric conductivity is given to palm nut shells which are most preferably employable as a raw material for producing active carbon. In addition, an electricity supplying method is practiced such that arc discharge is induced during the step of activating so as to heat the carbonized palm nut shells by self-heating of them with their own electric resistance. Thus, active carbon having a high quality can be produced without any fluctuation in quality with very simple operations by properly controlling a quantity of electricity to be consumed and a quantity of steam to be sprayed during the step of activating. Additionally, with the method of the present invention, a treating time is shortened to a level of 1/6 to 1/20, a fuel consumption cost is reduced to a level of 1/5 to 1/8 and a yielding rate is increased by 2.7 to 3.8 times compared with those of the conventional method. Conclusively, the present invention has provided a method and an apparatus for producing active carbon not only at a high operational efficiency but also at an inexpensive cost.

While the present invention has been described above only with respect to two preferred embodiments thereof, it should of course be understood that the present invention should not be limited only to these embodiments but various changes or modifications may be made without departure from the scope of the invention as defined by the appended claims.

What is claimed is:

1. An apparatus for producing an active carbon using a carbon-containing material as a raw material comprising:
a carbonizing unit for carbonizing said carbon-containing material to produce a carbonized material having electric conductivity; and
an activating treatment unit downstream of said carbonizing unit for activating said carbonized material in an atmosphere composed of steam with an application of electric power to induce electric discharge whereby said carbonized material is self heated and said self heated is a function of the electrical resistance of the carbonized material, and wherein said activating treatment unit includes a spirally extending screw conveyor, a plurality of discharge electrodes arranged around said screw conveyor in a substantially equally spaced relationship for inducing an electric discharge between adjacent discharge electrodes, and a rotary steam supply pipe having a plurality of spray nozzles attached thereto to allow steam to be sprayed therethrough toward the carbonized material thereby to generate an atmosphere of steam.

2. The apparatus as claimed in claim 1 wherein said activating treatment unit is constructed in the form of a tunnel furnace including a chain conveyor for conveying the carbonized material through said tunnel furnace, a plurality of activating chambers arranged in an upstream region of said tunnel furnace in a substantially equally spaced relationship on said chain conveyor, electrode plates arranged on the opposed longitudinal sides of said chain conveyor for inducing electric discharge therebetween, a plurality of steam spray nozzles for spraying steam toward the carbonized material to generate an atmosphere of steam, a plurality of cooling chambers arranged in the downstream region of said tunnel furnace in an equally spaced relationship on said chain conveyor, and a plurality of water spray nozzles for spraying water toward an activated material to gradually cool a resultant product of active carbon.

3. An apparatus for producing an active carbon using a used active carbon as a raw material, comprising:
a carbonizing unit for heating, without intake of environmental air, said used active carbon to allow said used active carbon to be converted into its active state while exhibiting electric conductivity; and
an activating treatment unit downstream of said carbonizing unit for activating said used active carbon in an atmosphere composed of steam with an application of electric power to induce electric discharge whereby said carbonized material is self heated and said self heated is a function of the electrical resistance of the carbonized material, and wherein said activating treatment unit includes a spirally extending screw conveyor, a plurality of discharge electrodes arranged around said screw conveyor in a substantially equally spaced relationship for inducing an electric discharge between adjacent discharge electrodes, and a rotary steam supply pipe having a plurality of spray nozzles attached thereto to allow steam to be sprayed therethrough toward the carbonized material thereby to generate an atmosphere of steam.

4. The apparatus as claimed in claim 3 wherein said activating treatment unit is constructed in the form of a tunnel furnace including a chain conveyor for conveying the carbonized material through said tunnel furnace, a plurality of activating chambers arranged in an upstream region of said tunnel furnace in a substantially equally spaced relationship on said chain conveyor, electrode plates arranged on the opposed longitudinal sides of said chain conveyor for inducing electric discharge therebetween, a plurality of steam spray nozzles for spraying steam toward the carbonized material to generate an atmosphere of steam, a plurality of cooling chambers arranged in the downstream region of said tunnel furnace in an equally spaced relationship on said chain conveyor, and a plurality of water spray nozzles for spraying water toward an activated material to gradually cool a resultant product of active carbon.

* * * * *